US009018587B2

(12) United States Patent
Duraj (10) Patent No.: US 9,018,587 B2
(45) Date of Patent: Apr. 28, 2015

(54) RADIATION DETECTION APPARATUS WITH NOISE COMPENSATION AND A METHOD OF USING THE SAME

(71) Applicant: Artan Duraj, Seven Hills, OH (US)

(72) Inventor: Artan Duraj, Seven Hills, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 14/030,850

(22) Filed: Sep. 18, 2013

(65) Prior Publication Data

US 2014/0084168 A1   Mar. 27, 2014

Related U.S. Application Data

(60) Provisional application No. 61/706,405, filed on Sep. 27, 2012.

(51) Int. Cl.
  *G01T 1/20*    (2006.01)
  *G01T 1/208*   (2006.01)

(52) U.S. Cl.
  CPC .............. *G01T 1/208* (2013.01); *G01T 1/2006* (2013.01)

(58) Field of Classification Search
  USPC ........................................................ 250/362
  See application file for complete search history.

(56) References Cited

U.S. PATENT DOCUMENTS

| 5,023,450 | A |  | 6/1991 | Gold |
| 5,083,124 | A |  | 1/1992 | Nordstrom |
| 5,483,061 | A |  | 1/1996 | Sloan |
| 5,679,956 | A |  | 10/1997 | Johnston |
| 5,744,803 | A |  | 4/1998 | Grodsinsky et al. |
| 6,087,656 | A | * | 7/2000 | Kimmich et al. .......... 250/252.1 |
| 7,081,626 | B2 | * | 7/2006 | Ianakiev et al. .......... 250/363.07 |
| 8,173,954 | B2 |  | 5/2012 | Duraj |
| 8,700,359 | B2 | * | 4/2014 | Au et al. ....................... 702/189 |
| 2007/0284518 | A1 |  | 12/2007 | Randall |
| 2009/0114828 | A1 | * | 5/2009 | Decker et al. ................ 250/364 |

(Continued)

FOREIGN PATENT DOCUMENTS

WO   2011063154 A2   5/2011

OTHER PUBLICATIONS

Gerbier, G., et al. "Pulse Shape Discrimination and Dark Matter Search with NaI(Tl) Scintillator at the Laboratoire Souterrain de Modane", Sources and Detection of Dark Matter and Dark Energy in the Universe, 2001, pp. 333-339.

(Continued)

*Primary Examiner* — David J Makiya
*Assistant Examiner* — Taeho Jo
(74) *Attorney, Agent, or Firm* — Abel Law Group, LLP; Robert N. Young (57) ABSTRACT

A radiation detection apparatus includes a sonde having a housing and comprising a scintillator disposed within the housing and a calibration source coupled to the scintillator to fluoresce the scintillator at a known wavelength of electromagnetic radiation. The radiation detection apparatus further includes an electromagnetic radiation sensing device coupled to the scintillator and disposed within the housing and a first programmable/re-programmable processing module (PRPM) coupled to the electromagnetic radiation sensing device and disposed within the housing. The PRPM can be programmed to use state information when analyzing pulses corresponding to shock, vibration, or another noise source. In another embodiment, the PRPM can be used to monitor the health of the radiation detection apparatus.

20 Claims, 2 Drawing Sheets

(56) References Cited

U.S. PATENT DOCUMENTS

2010/0090111 A1* 4/2010 Stoller et al. ............... 250/337
2010/0176286 A1* 7/2010 Duraj ........................ 250/262
2010/0231905 A1   9/2010 Christian et al.
2011/0095173 A1   4/2011 Menge et al.
2012/0043458 A1*  2/2012 Herr et al. .................. 250/239
2012/0126127 A1*  5/2012 Duraj et al. ................ 250/369
2012/0200421 A1   8/2012 Duraj
2012/0312994 A1* 12/2012 Nikitin et al. .............. 250/362
2013/0168556 A1*  7/2013 Blackburn et al. .......... 250/362

OTHER PUBLICATIONS

Yousefi, Siavash "An Abstract of the Thesis of: Siavash Yousefi for the degree of Master of Science in Electrical and Computer Engineering on May 29, 2008. Title: Digital Pulse Shape Discrimination Methods for Triple-Layer Phoswich Detectors Using Wavelets and Fuzzy Logic", 5 pages.

International Search Report for PCT/US2013/060444 dated Dec. 10, 2013, 4 pgs.

* cited by examiner

RADIATION DETECTION APPARATUS WITH NOISE COMPENSATION AND A METHOD OF USING THE SAME

CROSS-REFERENCE TO RELATED APPLICATION

This application claims priority under 35 U.S.C. §119(e) to U.S. patent application Ser. No. 61/706,405 entitled "Radiation Detection Apparatus With Noise Compensation and a Method of Using the Same" by Duraj filed Sep. 27, 2012, which is assigned to the current assignee hereof and incorporated herein by reference in its entirety.

BACKGROUND

1. Field of the Disclosure

The following is directed to radiation detection apparatuses, and more particularly to radiation detection apparatuses with noise compensation and methods of using the same.

2. Description of the Related Art

Spectral gamma ray measurements play a major role in oil and gas logging operations by providing a way to interpret the porosity-lithology and naturally occurring radioactive materials in the surrounding rock strata. Certain properties of rock formations can be directly correlated to the oil or gas production performance of the strata within a field. For example, the amount of naturally occurring radioactive material can be correlated to conditions which are indicative of hydrocarbon producing formations.

However, the detection of gamma rays requires sensitive materials and complex electronics. In particular, the electronic components are often highly application-specific components that analyze the spectral information to ascertain certain properties of the surrounding rock strata. Additionally, the sensitive materials and complex electronics are subject to harsh environmental conditions, including continuous mechanical shocks and vibrations and broad temperatures ranges, from above-ground ambient temperatures to elevated temperatures that may be in excess of 150° C. The industry continues to need improved radiation detection apparatuses capable of reliable service and stable analysis over a wide range of temperatures.

BRIEF DESCRIPTION OF THE DRAWINGS

Embodiments are illustrated by way of example and are not limited by the accompanying figures.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "rare earth" or "rare earth element" is intended to mean Y, Sc, and the Lanthanides (La to Lu) in the Periodic Table of the Elements.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 1:
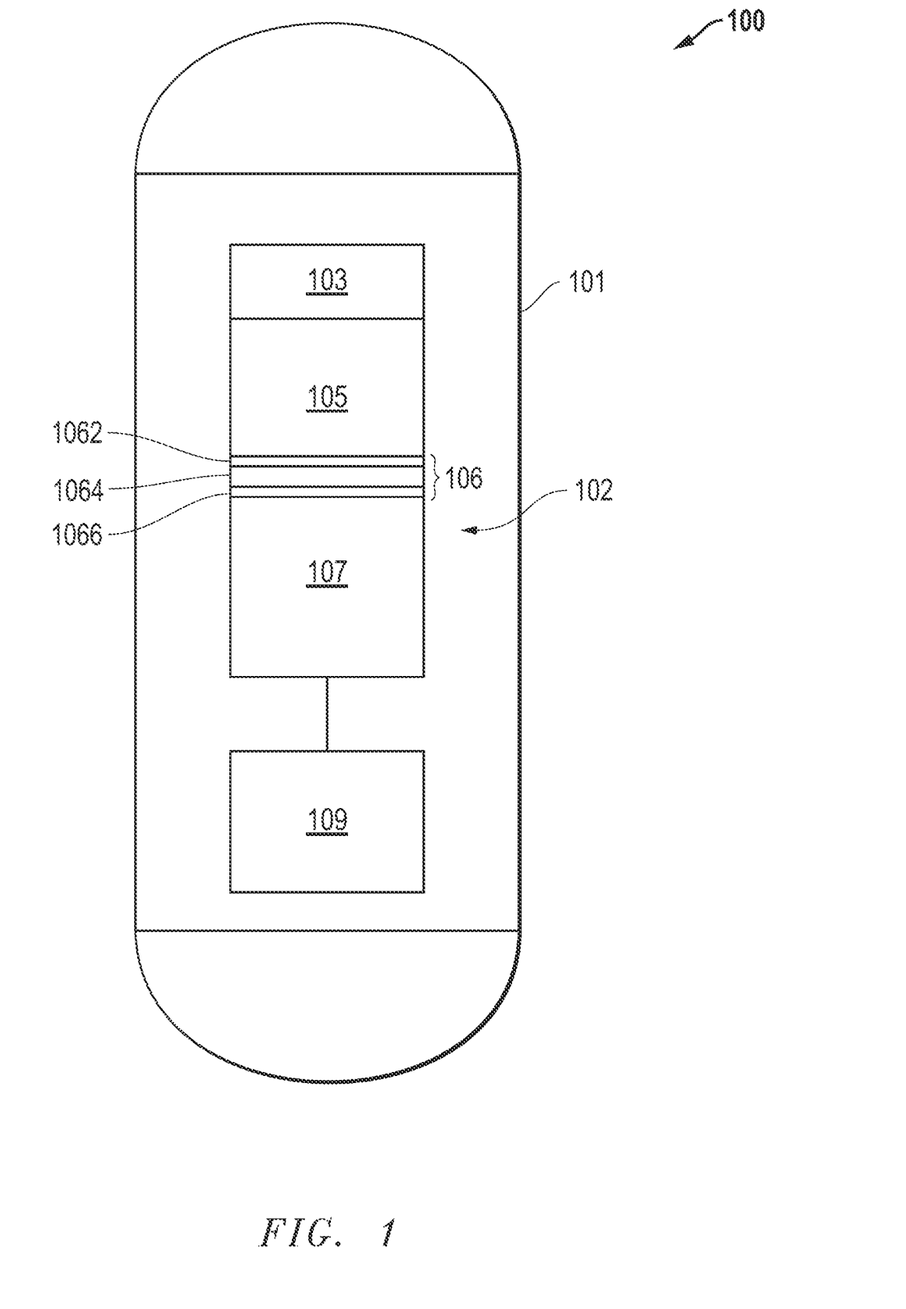
FIG. 1 includes a schematic depiction of a sonde including a radiation detection apparatus in accordance with an embodiment.

FIG. 1 includes a schematic depiction of a sonde 100 including a radiation detection apparatus 102 in accordance with an embodiment. The sonde 100 is a probe that can include a variety of devices that can be used in exploring regions and environments unsuitable for humans. One such application is exploratory drilling or well-logging applications in which holes can be drilled within the crust of the earth in order to explore and characterize rock structures below the surface. The sonde 100 may be a stand-alone tool or may be incorporated with other equipment near the distal end of a drill string. The other equipment can include a drill bit at the tip of the distal end, a turbine coupled to the drill bit, a generator or alternator coupled to the turbine, a battery or other energy storage device, a variety of sensors, such as rotational speed sensors, positional sensors, pressure sensors, and the like. The drill string includes sections of pipe that are screwed together and are manipulated at the proximal end of the drill string, which is at the surface. For example, the entire drill string can be rotated during drilling Mud pumps outside the well bore pump mud along the drill string. The mud serves multiple purposes, one of which is to cause the rotor of the downhole turbine to spin. During drilling, many different parts of the drill string can be in motion. For example, the entire drill string may be rotating while mud is being pumped along the drill string which in turn causes the turbine to operate, which in turn causes the drill bit to rotate. The drilling can expose the radiation detection apparatus to be exposed to vibration, shock, or other noise that are generated near the radiation detection apparatus or are transmitted along any portion of the drill string, including from sources outside the drill string, such as the mud pumps. The significance of the noise is addressed later in this specification.

As illustrated, the sonde 100 can include a housing 101 for encapsulating and enclosing the radiation detection apparatus 102, can be part of a measurement-while-drilling (MWD) device. The housing 101 can be made of a material suitable for withstanding harsh environments including large temperature shifts from ambient conditions to temperatures in excess of 150° C., in excess of 200° C. or higher. The housing is sealed against pressures as high as 70 MPa (10,000 pounds per square inch). Additionally, the housing 101 may be capable of withstanding severe mechanical stresses, shocks, and vibrations. As such, the housing 101 can be made of a metal or metal alloy material. Often, the housing 101 can be sealed to protect sensitive components inside from liquids, such as water, encountered in well-logging applications.

The radiation detection apparatus 102 can include materials and components suitable for detecting certain types of radiation in order to facilitate analyzing and characterizing rock structures surrounding the sonde 100, including properties such as the presence of hydrocarbon materials, presence of water, density of the rock, porosity of the geological formations, and the like. In a particular embodiment, the radiation detection apparatus 102 includes a calibration source 103, a scintillator 105, an optical coupling member 106, a photosensor 107, and a control module. The calibration source 103 can be coupled to the scintillator 105, and the scintillator 105 can be optically coupled to the photosensor 107, and the control module 109 can be unidirectionally or bidirectionally coupled to the photosensor 107. In another particular embodiment, the calibration source 103 may be a standalone unit and may be transported to different locations to calibrate different radiation detection apparatuses. Depending on the calibration source 103, the control module 109 may or may not be coupled to the calibration source 103.

In an embodiment, the calibration source 103 can be a component capable of emitting radiation at a known wavelength or spectrum of wavelengths suitable to cause the scintillator 105 to emit scintillating light. In a particular embodiment the calibration source includes a light emitting diode (LED) or laser diode (LD). Some suitable LEDs include those that emit light within the ultraviolet portion of the spectrum. When the calibration source 103 includes an electronic device, the calibration source 103 may be coupled to the control module 109. In an alternative embodiment, the calibration source may be controlled at the surface. In another embodiment, the calibration source 103 is a radioactive isotope. In one particular embodiment, the calibration source 103 includes radioactive isotopes, such as cobalt 60 ($^{60}$Co),) americium 241 ($^{241}$Am),) cesium 137 ($^{137}$Cs), or an isotope of a Lanthanide element. The wavelength of radiation emitted by the calibration source 103 may be such that it is detectable by the scintillator 105 and not the photosensor 107. For example, the photosensor 107 may not be significantly sensitive to the particular wavelength or spectrum of wavelengths of radiation emitted by the calibration source 103. In this manner, scintillating light from the scintillator 105, and not radiation from the calibration source 103, is sensed by the photosensor 107.

The scintillator 105 can be a material that responds to radiation by emitting scintillating light at a known wavelength or spectrum of wavelengths depending on the type of radiation captured by the scintillator 105. In accordance with an embodiment, the scintillator 105 can be made of a crystalline material, a liquid material, a gel, or another suitable scintillator material. The scintillator 105 can include an inorganic or organic material. Depending on the material, the scintillator 105 can be sensitive to different types of radiation. In an embodiment, the scintillator 105 is an inorganic crystalline or ceramic scintillator and includes a halogen-containing material, an oxide, a sulfide, or any combination thereof. The inorganic scintillator material may contain an alkali or rare earth element. A scintillator material suitable to emit scintillating light in response to capturing gamma rays include activated lanthanum bromide, activated lanthanum chloride, activated sodium iodide, activated cesium iodide, or activated bismuth germinate. A particular activating species can include cerium, thallium, praseodymium, europium, or neodymium. In a particular embodiment, the scintillator is thallium-activated sodium iodide or a rare earth halide, such as $LaBr_3$:Ce. In another embodiment, the scintillator 105 is an elpasolite, such as $Cs_2LiCl_6$:Ce. A liquid scintillator material capable of emitting scintillating light at a temperature in excess of 150° C. may be used. In other embodiment, the scintillator 105 includes an organic material, such as anthracene. An organic scintillator material can include a polymer, such as a polyvinyl toluene, a polystyrene, an acrylic, and anther suitable organic scintillator material or any combination thereof.

The optical coupling material 106 can include a window 1064, a scintillator pad 1062 between the scintillator 105 and the window 1064, and a photosensor pad 1066 between the window 1064 and the photosensor 107. The window 1064 can be ultraviolet transparent or translucent. In a particular embodiment, the window 1064 includes a glass, a sapphire, an aluminum oxynitride, or the like. Each of the scintillator pad 1062 and the photosensor pad 1066 can include a pad material, such as a silicone rubber or a clear epoxy. In a particular embodiment, the scintillator pad 1062, the photosensor 1066, or both can filter ultraviolet that may be useful in determining where a spark occurred. More details about ultraviolet light filtering by the pads 1062 and 1066 are addressed later in this specification.

The photosensor 107 can generate an electronic pulse in response to receiving scintillating light from the scintillator 105. The photosensor 107 can be a photomultiplier tube (PMT), a semiconductor-based photomultiplier, or another suitable device that generates an electronic pulse in response to the scintillating light. The electronic pulse from the photosensor 107 can be transmitted to the control module 109.

The control module 109 can be used to receive and process an electronic pulse from the photosensor 107 to enable a user to evaluate information gathered by the radiation detection apparatus 102. The control module 109 may include an amplifier, an analog-to-digital converter, a processor, a memory, another suitable component, or any combination thereof. The control module 109 can also include electronic components that can send control signals to the calibration source 103 when the calibration source 103 includes an electronic component. The control module 109 may be able to receive state information associated with the radiation detection apparatus 102. Thus, the state information can include state information of the radiation detection apparatus 102. When the radiation detection apparatus 102 is coupled to other equipment (for example, well drilling equipment), the state information may include state information of such other equipment. In an embodiment, the state information can include temperature and pressure of the sonde 100 or a location adjacent to sonde 100, operational parameters, such are turbine speed, drill bit speed, rotational speed of the drill string, or other suitable information. More details regarding the operation of the control module 109 with respect to processing electronic pulses from the photosensor 107 are described in more detail later in this specification. While the control module 109 can be contained within the sonde 101, the control module 109 may be located at the surface. When the control module 109 is within the sonde 101, the control module 109 may be powered by a downhole generator, alternator, or local energy storage device, such as a battery.

The radiation detection apparatus 102 can be used within the well bore to allow MWD information to be obtained. U.S. Pat. No. 8,173,954, which is incorporated in its entirety, addresses operation of a radiation detection apparatus similar to that previously described. The radiation detection apparatus 102 in accordance with concepts as described herein is configured to provide further functionality not explicitly disclosed in U.S. Pat. No. 8,173,954.

The radiation detection apparatus 102 may be used in well-logging applications and, as such, the radiation detection apparatus 102 may be exposed to harsh conditions, such as high temperature and one or more conditions (vibration, shock, or another noise) that may cause noise that is reflected in the electronic pulse from the photosensor 107. The amount of noise reflected in the photosensor 107 can vary as a function of temperature. To improve the accuracy of the radiation detection system 102, the control module can be configured to use state information associated with the radiation detection apparatus to more accurately identify noise, as opposed to scintillating light. The state information may include temperature, pressure, operational mode or conditions of the radiation detection apparatus 109 or other equipment, other suitable data, or the like. For example, the state information may include the temperature as measured by a sensor adjacent to the photosensor 107. As a particular non-limiting example, an electronic pulse for a noise source at room temperature (for example, approximately 25° C.) may be different than an electronic pulse for the same noise source at a higher temperature, for example 200° C.

Figure 2:
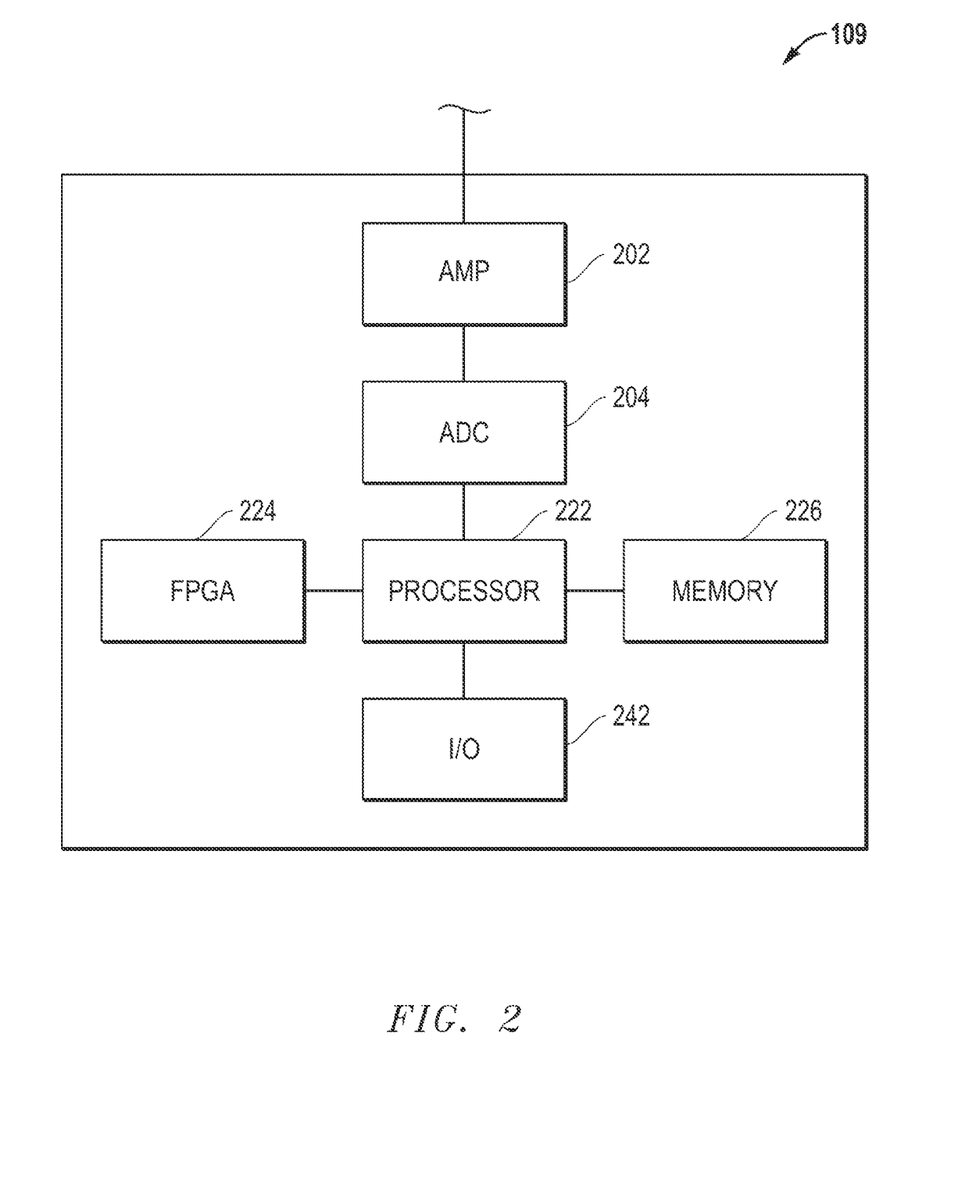
FIG. 2 includes a schematic view of a portion of a control module in accordance with an embodiment.

FIG. 2 includes a schematic diagram of an illustrative, non-limiting embodiment of the control module 109. As illustrated, an amplifier 202 is coupled to an analog-to-digital converter 204, which is coupled to a processor 222. The processor 222 is coupled to a field programmable gate array ("FPGA") 224 or application-specific integrated circuit ("ASIC"), a memory 226, and an input/output ("I/O") module 242. The couplings may be unidirectional or bidirectional. The functions provided by the components are discussed in more below. In another embodiment, more, fewer, or different components can be used in the control module 109. For example, functions provided by the FPGA 224 may be performed by the processor 222, and thus, the FPGA 224 is not required. The FPGA 224 can act on information faster than the processor 222.

Before the FPGA 224 is used in well logging or another application, information regarding light output from the scintillator 105 when the scintillator is at different temperatures and from noise sources when the photosensor 107 is at different temperatures is programmed into the FPGA 224. Such information may be obtained by subjecting the scintillator 105, the photosensor 107, or the radiation detection apparatus 102 to environmental conditions to which the scintillator 105, the photosensor 107, or the radiation detection apparatus 102 will be exposed. For example, the radiation detection apparatus 102 may be subjected to vibration at a frequency that corresponds to the turbine of the drill string when operating or contacting rock when drilling, and obtaining readings when exposed to a plurality of temperatures in a range of 100° C. to 250° C. Additional information may be obtained when the radiation detection apparatus 102 is exposed to radiation when exposed to a plurality of temperatures in a range of 100° C. to 250° C. Both the light output of the scintillator 105 and the electronic pulse corresponding to the vibration can be affected by temperature. Further information within the FPGA 224 can also include pulse shape discrimination information to help to characterize scintillating light to determine the type or source of radiation captured by the scintillator 105, if needed or desired.

During operation, an electronic pulse from the photosensor 107 can be received at the control module 109, and the electronic pulse can be amplified by the amplifier 202, and the amplified electronic pulse can be converted to a digital pulse by the analog-to-digital converter 204. The digital pulse can be received by the processor 222. The digital pulse can be processed by the processor 222, sent from the processor to the FPGA 224, to the memory 226, or to the I/O module 242. Although not illustrated, the processor 222 can receive state information from sensors or other devices within the radiation detection system or outside of the radiation detection system. The state information may be stored in the memory 226. When the digital pulse is received by the processor 222, the processor 222 can request the latest state information from the memory 226, if the processor 222 does not already have such state information. The digital pulse and state information can be sent from the processor 222 to the FPGA 224.

The FPGA 224 can use the digital pulse and state information and determine whether the digital pulse corresponds to scintillating light or noise. The FPGA 224 may able to identify a radiation source based on the digital pulse. In a non-limiting embodiment, the digital pulse and temperature within the radiation detection apparatus 102 and compare the digital pulse to stored digital pulses corresponding to the same temperature. The FPGA 224 can identify which one or more stored digital pulses are closest to the digital pulse recently received from the processor 222. The FPGA 224 can send information to processor 222 whether the digital pulse corresponds to noise or scintillating light, and if scintillating light, potentially further information regarding a possible targeted radiation (gamma radiation, x-rays, neutrons, or the like) corresponding to the scintillating light. If the digital pulse corresponds to noise, the digital pulse may be discarded. If the digital signal corresponds to scintillating light, the processor 222 may store the digital pulse, information from FPGA 224, or a combination thereof into the memory 226 or may pass the digital pulse, state information, other information (for example, type of radiation), or any combination thereof from FPGA 224 to the processor 222, which may in turn store the digital pulse, state information, other information, or any combination in the memory 226, send the digital pulse, state information, other information, or any combination to the I/O module 228 for transmission outside the radiation detection apparatus 102, or perform any combination thereof. In an embodiment, some information may be stored and other information transmitted, and in another embodiment all of such information received from the FPGA 224 may be stored and transmitted. Other embodiments may be used and not deviate from the scope of the concepts described herein.

Some or all of the functions described with respect to the FPGA 224 may be performed by the processor 222, and therefore, the FPGA 224 is not required in all embodiments. Further, the FPGA 224, the memory 226, the I/O module 242, or any combination thereof may be within the same integrated circuit as the processor 222. In another embodiment, the control module 109 does not need to be housed within the radiation detection apparatus 102. The control module 109 may be outside the well bore. Still further, at least one component of the control module 109, as illustrated in FIG. 2 may be within the radiation detection apparatus 102 and at least one other component may be outside the radiation detection apparatus 102, such as outside the well bore. In well-logging applications, information from the devices close to the distal end of the drill string, such as the radiation detection apparatus 102, may take approximately 0.5 to approximately 5 minutes to reach the surface. The control module 109 within the radiation detection apparatus 102 can allow operations to proceed quickly without having data transmission delays.

In some applications, such as well-logging applications, the sonde 100 and radiation detection apparatus 102 may be subject to high temperatures. The intensity of radiation received by the scintillator 105 from calibration source 103 or from the surrounding environment, such as a strata formation is typically not significantly affected by such high temperatures. However, such high temperatures can have an adverse effect on the radiation detection apparatus output, and more particularly, the scintillating light output of the scintillator 105, the electronic pulse output from the photosensor 107 due to shock, vibration, or another noise source, or a combination of effects of the light output and electronic pulse. With respect to the scintillating light, depending upon the scintillator material of the scintillator 105, the loss in terms of scintillating light output may be approximately 0.3% per 1° C. increase when the temperature is in a range of 25° C. to 150° C., while losses for the photosensor 107 just for the reduction in scintillating light output may be approximately 0.4% per 1° C. increase when the temperature is within such temperature range.

Embodiments as described herein can allow the location or source of shock, vibration, or other noise source within the radiation detection apparatus to be determined. In a particular embodiment, the scintillator pad 1062, the photosensor pad 1066 can filter ultraviolet light that can be useful in determining where a spark occurred. The spark may result from excess charge building up within the radiation detection apparatus 102, is on the scintillator side of the scintillator pad 1062, light from the spark, including ultraviolet light, can be captured by the scintillator 105, which in turn emits scintillating light in response to the light from the spark. The scintillator pad 1062 may include a material that filters some or all ultraviolet light. If the spark is generated on the other side of the scintillator pad 1062, the amount of ultraviolet light that reaches the scintillator 105 will be reduced, and the scintillating light output can be likewise be reduced. Thus, the output for the different locations of the spark can allow for different electronic signatures to be produced by the photosensor 107. A spark within the photosensor 107 can have yet another electronic signature. Accordingly, locations or sources of sparks within the radiation detection apparatus may be determined based on the electronic pulse generated by the photosensor.

Further, embodiments as described herein can be used to monitor the health of the radiation detection apparatus. A background signal level when operating the radiation detection apparatus can be performed by the manufacturer or a user of the apparatus. The data can be collected in a manufacturing or testing facility or may be collected when the apparatus is employed in the field. For example, the information can be collected during a laboratory set-up or may be collected when the radiation detection apparatus is outdoors or within a well bore. In a particular embodiment, in a laboratory, a radiation source is placed near the radiation detection apparatus and data is collected. In another particular embodiment, the radiation detection apparatus may be placed within a well bore. Data may be collected while the system is idling, for example, when not drilling. The mud pumps and other equipment may be operating, and therefore, some vibration may be transmitted along the drill string. The portion of the drill string where the radiation detection apparatus resides may not be rotating and no significant downforce pressure may be applied to the drill bit. Alternatively, data may be collected during normal drilling operations (drill string may be rotating, downforce pressure may be applied on the bit, or both). Other configurations for collecting data may be used without departing from the scope of the concepts as described herein. Anytime a pulse is sent from the photosensor that exceeds the background signal level, the pulse can be analyzed to determine to what the pulse corresponds and increment an appropriate counter (a gamma counter, a beta counter, a particular noise counter, or the like).

Part of monitoring the health of the radiation detection apparatus may include determining the location or source of a spark or other noise within the radiation detection apparatus as previously described. The PRPM can include information regarding noise pulses from known locations, sources, or both within the radiation detection apparatus. In an embodiment, such information may be within the FPGA or the memory. In another embodiment, when the photosensor is a photomultiplier tube, noise may correspond to a position of a particular dynode shifting within the photosensor or may correspond to a spark that that is on the scintillator side of the scintillator pad. The pulse from the photosensor can be compared to pulses corresponding to the dynode's position shifting, the spark, and potentially other locations or sources of noise within the radiation detection apparatus. When the pulse is determined to correspond to a location or source of noise, the PRPM can record the information in the memory, send such information to a user via the I/O module, or a combination thereof.

Monitoring the health can include other aspects. Shock, vibration, or another noise source may be detected at a rate when the radiation detection apparatus is first used. Over time, the frequency of events that are identified as shock, vibration, or another noise source may increase over the life of the radiation detection apparatus. Such an increase may reflect that the radiation detection apparatus is damaged or is near the end of its useful life. For example, the position of a dynode within a photomultiplier may have shifted or become loose. Accordingly, embodiments as described herein can be used to indicate a problem within the radiation detection apparatus, the radiation detection apparatus is nearing the end of its useful life, or the like.

A count or count rate of pulses corresponding to shock, vibration, or other noise source, or a fraction of pulses corresponding to shock, vibration, or other noise source, may be compared to total counts or compared to counts corresponding to scintillating light generated by the scintillator in response to capturing targeted radiation (for example, gamma rays, x-rays, neutrons, or the like). In an embodiment, a threshold value for the count or count rate can be set and when the threshold value is exceeded, the event can be recorded in memory, sent to a user via the I/O module, or a combination thereof. In another embodiment, the fraction can be used instead, and the fraction can be the count or the count rate corresponding to the one or more noise sources divided by a count or count rate of a number of pulses corresponding to targeted radiation being captured by the scintillator or a total count (includes counts from noise and from targeted radiation).

In a non-limiting embodiment, soon after manufacturing or during an early field use of a radiation detection apparatus, the radiation detection apparatus may have 1 count/10 minutes corresponding to noise sources, and 500 counts/10 minutes corresponding to scintillating light from capturing targeted radiation. Later on, the radiation detection apparatus may have 4 counts/10 minutes corresponding to noise sources, and the scintillation count rate remains at 500 counts/10 minutes. Clearly, the noise count rate is increasing but is still substantially smaller than the scintillation count rate. The higher noise count rate can be used to indicate that the radiation detection apparatus likely has a problem even though the noise count rate as a fraction of the scintillation count rate or total count rate (504 counts/10 minutes) remains small.

The count, count rate, or fraction as previously described may be determined as a cumulative value for all noise sources or can be separated by location or source of noise. Thus, in an application, only noise from the photosensor may be of concern as it may indicate that the photosensor has a problem or is nearing the end of its useful life. In another application, sparks on the scintillator side of the scintillator pad may indicate that a spring or shock absorbing material may be losing its resiliency. Other information can be generated as needed or desired for other applications.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Item 1. A radiation detection apparatus comprising a scintillator; a photosensor optically coupled to the scintillator; and a control module electrically coupled to the photosensor. The control module is configured to analyze state information associated with the radiation detection apparatus; receive a pulse from the photosensor; and determine whether or not the pulse corresponds to the one or more noise sources at a condition corresponding to the state information.

Item 2. The radiation detection apparatus of Item 1, wherein the control module is further configured to discard the pulse when the pulse corresponds to the one or more noise sources; and pass the pulse when the pulse does not correspond to the one or more noise sources.

Item 3. The radiation detection apparatus of Item 1 or 2, wherein the control module is further configured to monitor a health of the radiation detection apparatus.

Item 4. The radiation detection apparatus of any one of the preceding Items, wherein the state information includes a temperature adjacent to the photosensor.

Item 5. The radiation detection apparatus of any one of the preceding Items, wherein the control module is further configured to determine whether or not the pulse corresponds to a targeted radiation.

Item 6. The radiation detection apparatus of Item 5, wherein the control module is further configured to increment a counter when the pulse corresponds to the targeted radiation.

Item 7. The radiation detection apparatus of any one of the preceding Items, wherein the control module is further configured to compare the pulse to a temperature-adjusted pulse for a known radiation source.

Item 8. A radiation detection apparatus comprising a scintillator; a photosensor optically coupled to the scintillator; and a control module electrically coupled to the photosensor. The control module is configured to receive a pulse from the photosensor; determine whether or not the pulse corresponds to the one or more noise sources at a condition corresponding to the state information; and monitor a health of the radiation detection apparatus in response to determining whether or not the pulse corresponds to the one or more noise sources.

Item 9. The radiation detection apparatus of Item 3 to 8, wherein monitor the health of the radiation detection apparatus comprises determine when a count of a number of pulses corresponding to the one or more noise sources or a count rate based on the count exceeds a threshold value.

Item 10. The radiation detection apparatus of Item 3 to 8, wherein monitor the health of the radiation detection apparatus comprises determine when a fraction exceeds a threshold value, wherein the fraction is:
a first count of a number of pulses corresponding to the one or more noise sources divided by a second count of a number of pulses corresponding to targeted radiation being captured by the scintillator or a total count that is a sum of the first and second counts; or
a first count rate of pulses corresponding to the one or more noise sources divided by a second count rate of pulses corresponding to targeted radiation being captured by the scintillator or a total count rate that is a sum of the first and second count rates.

Item 11. The radiation detection apparatus of Item 3 to 8, wherein monitor the health of the radiation detection apparatus comprises determine a location or a source of a noise within the radiation detection apparatus.

Item 12. The radiation detection apparatus of Item 11, wherein determine a location or a source of a noise within the radiation detection apparatus comprises compare a pulse corresponding to the one or more noise sources to other pulses corresponding to known locations or sources of noise.

Item 13. The radiation detection apparatus of any one of the preceding Items, wherein the control module further comprises a field programmable gate array that is configured to perform any one or more actions of Item 1.

Item 14. A method of using radiation detection apparatus comprising providing the radiation detection apparatus comprising a scintillator optically coupled to a photosensor that is electrically coupled to a control module; analyzing state information associated with the radiation detection apparatus; receiving an electronic pulse from the photosensor; and determining whether or not the pulse corresponds to the one or more noise sources at a condition corresponding to the state information.

Item 15. The method of Item 14, further comprising discarding the pulse when the pulse corresponds to the one or more noise sources; and passing the pulse when the pulse does not correspond to the one or more noise sources.

Item 16. The method of Item 14 or 15, further comprising monitoring a health of the radiation detection apparatus.

Item 17. The method of any one of Items 14 to 16, wherein determining comprises comparing electronic pulse to a pulse corresponding to a particular noise source at a particular temperature.

Item 18. The method of any one of Items 14 to 17, further comprising determining whether or not the pulse corresponds to a targeted radiation.

Item 19. The method of Item 18, further comprising incrementing a counter when the pulse corresponds to the targeted radiation.

Item 20. The method of Item 18, further comprising adjusting the pulse for a condition corresponding to the state information.

Item 21. The method of Item 20, wherein the condition is temperature adjacent to the scintillator.

Item 22. The method of any one of Items 16 to 21, further comprising performing spectral analysis on the pulse.

Item 23. A method of using radiation detection apparatus comprising providing the radiation detection apparatus comprising a scintillator optically coupled to a photosensor that is electrically coupled to a control module; receiving an electronic pulse from the photosensor; determining whether or not the pulse corresponds to the one or more noise sources at a condition corresponding to the state information; and monitoring a health of the radiation detection apparatus in response to determining whether or not the pulse corresponds to the one or more noise sources.

Item 24. The method of any one of Items 16 to 23, wherein monitoring the health of the radiation detection apparatus comprises determining when a count of a number of pulses corresponding to the one or more noise sources or a count rate based on the count exceeds a threshold value.

Item 25. The method of any one of Items 16 to 23, wherein monitoring the health of the radiation detection apparatus comprises determining when a fraction exceeds a threshold value, wherein the fraction is:

a first count of a number of pulses corresponding to the one or more noise sources divided by a second count of a number of pulses corresponding to targeted radiation being captured by the scintillator or a total count that is a sum of the first and second counts; or a first count rate of pulses corresponding to the one or more noise sources divided by a second count rate of pulses corresponding to targeted radiation being captured by the scintillator or a total count rate that is a sum of the first and second count rates.

Item 26. The method of any one of Items 16 to 23, wherein monitoring the health of the radiation detection apparatus comprises determining a location or a source of a noise within the radiation detection apparatus.

Item 27. The method of Item 26, wherein determining a location or a source of a noise within the radiation detection apparatus comprises comparing a pulse corresponding to the one or more noise sources to other pulses corresponding to known locations or sources of noise.

Item 28. The radiation detection apparatus or the method of any one of the preceding Items, wherein noise corresponding to the noise data comprises vibration.

Item 29. The radiation detection apparatus or the method of any one of the preceding claims, wherein the radiation detection apparatus further comprises a housing that contains the scintillator, the photosensor, and the control module; and a physical biasing element within the housing, wherein the physical biasing element coupled to the scintillator.

Item 30. The radiation detection apparatus or the method of claim 29, wherein the physical biasing element comprises a spring or a stent.

Item 31. The radiation detection apparatus or the method of claim 29 or 30, wherein the housing comprises a metallic housing.

Item 32. The radiation detection apparatus or the method of any one of the preceding claims, wherein the scintillator, the photosensor, and the control module are parts of a measurement-while-drilling device.

Item 33. The radiation detection apparatus or the method of any one of the preceding claims, wherein the control module further comprises an analog-to-digital converter.

Item 34. The radiation detection apparatus or the method of claim 33, wherein the control module is further configured to send the pulse to a spectral analyzer.

Item 35. The radiation detection apparatus or the method of claim 34, wherein the spectral analyzer comprises a multichannel analyzer.

Item 36. The radiation detection apparatus or the method of any one of the preceding claims, wherein the control module comprises an amplifier.

Item 37. The radiation detection apparatus or the method of any one of the preceding claims, further comprising an optical coupling material disposed between the scintillator and the photosensor.

Item 38. The radiation detection apparatus or the method of claim 37, wherein the optical coupling material comprises an ultraviolet transparent or translucent material.

Item 39. The radiation detection apparatus or the method of claim 38, wherein the optical coupling material comprises a glass, a sapphire, or an aluminum oxynitride.

Item 40. The radiation detection apparatus or the method of any one of claims 37 to 39, wherein the optical coupling material in capable of filtering an ultraviolet radiation.

Item 41. The radiation detection apparatus or the method of any one of claims 37 to 39, wherein the optical coupling material comprises a clear epoxy or a silicone rubber.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A radiation detection apparatus comprising:
a scintillator;
a photosensor optically coupled to the scintillator; and
a control module electrically coupled to the photosensor, wherein the control module is configured to:
analyze state information associated with the radiation detection apparatus;
receive a pulse from the photosensor;
determine whether or not the pulse corresponds to targeted radiation captured by the scintillator or noise at a condition corresponding to the state information; and
for the pulse corresponding to the noise, determine a location or a source of the noise.

2. The radiation detection apparatus of claim 1, wherein the control module is further configured to:
discard the pulse when the pulse corresponds to the noise; and
pass the pulse when the pulse does not correspond to the noise.

3. The radiation detection apparatus of claim 1, wherein the control module is further configured to monitor a health of the radiation detection apparatus.

4. The radiation detection apparatus of claim 1, wherein the state information includes a temperature adjacent to the photosensor.

5. The radiation detection apparatus of claim 1, wherein the scintillator, the photosensor, and the control module are parts of a measurement-while-drilling device.

6. The radiation detection apparatus of claim 1, wherein the control module is further configured to compare the pulse to a temperature-adjusted pulse for a known location or source of noise.

7. The radiation detection apparatus of claim 6, wherein the control module further comprises a field programmable gate array that includes the temperature-adjusted pulse for the known location or source of noise.

8. The radiation detection apparatus of claim 1, wherein the source of the noise comprises vibration.

9. The radiation detection apparatus of claim 1, wherein the radiation detection apparatus further comprises:
 a housing that contains the scintillator, the photosensor, and the control module; and
 a physical biasing element within the housing, wherein the physical biasing element coupled to the scintillator.

10. A radiation detection apparatus comprising:
 a scintillator;
 a photosensor optically coupled to the scintillator; and
 a control module electrically coupled to the photosensor, wherein the control module is configured to:
  receive a pulse from the photosensor;
  determine whether or not the pulse corresponds to the noise at a condition corresponding to the state information; and
  monitor a health of the radiation detection apparatus based at least in part on a count or a count rate of noise events.

11. The radiation detection apparatus of claim 10, wherein monitor the health of the radiation detection apparatus comprises determine when the count or the count rate exceeds a threshold value.

12. The radiation detection apparatus of claim 10, wherein monitor the health of the radiation detection apparatus comprises determine when a fraction exceeds a threshold value, wherein the fraction is:
 a first count of a number of pulses corresponding to the noise events divided by a second count of a number of pulses corresponding to targeted radiation being captured by the scintillator or a total count that is a sum of the first and second counts; or
 a first count rate of pulses corresponding to the noise events divided by a second count rate of pulses corresponding to targeted radiation being captured by the scintillator or a total count rate that is a sum of the first and second count rates.

13. The radiation detection apparatus of claim 10, wherein monitor the health of the radiation detection apparatus comprises determine a location or a source of the noise corresponding to at least one of the noise events.

14. The radiation detection apparatus of claim 13, wherein determine the location or the source of a particular noise event of the noise events comprises compare a pulse corresponding to the noise to other pulses corresponding to known locations or sources of noise.

15. The radiation detection apparatus of claim 10, wherein the scintillator, the photosensor, and the control module are parts of a measurement-while-drilling device.

16. A method of using radiation detection apparatus comprising:
 providing the radiation detection apparatus comprising a scintillator optically coupled to a photosensor that is electrically coupled to a control module;
 analyzing state information associated with the radiation detection apparatus;
 receiving an electronic pulse from the photosensor; and
 determining whether or not the pulse corresponds to noise at a condition corresponding to the state information; and
 for the pulse corresponding to the noise, determining a location or a source of the noise.

17. The method of claim 16, further comprising monitoring a health of the radiation detection apparatus.

18. The method of claim 16, wherein determining comprises comparing electronic pulse to a pulse corresponding to a particular noise source at a particular temperature.

19. The method of claim 16, further comprising monitoring the health of the radiation detection apparatus is based on a count or a count rate of noise events.

20. The method of claim 16, further comprising:
 inserting the scintillator and the photosensor into a well bore; and
 generating an electronic pulse at the photosensor while the scintillator and photosensor are within the well bore.

* * * * *